Figure 1:
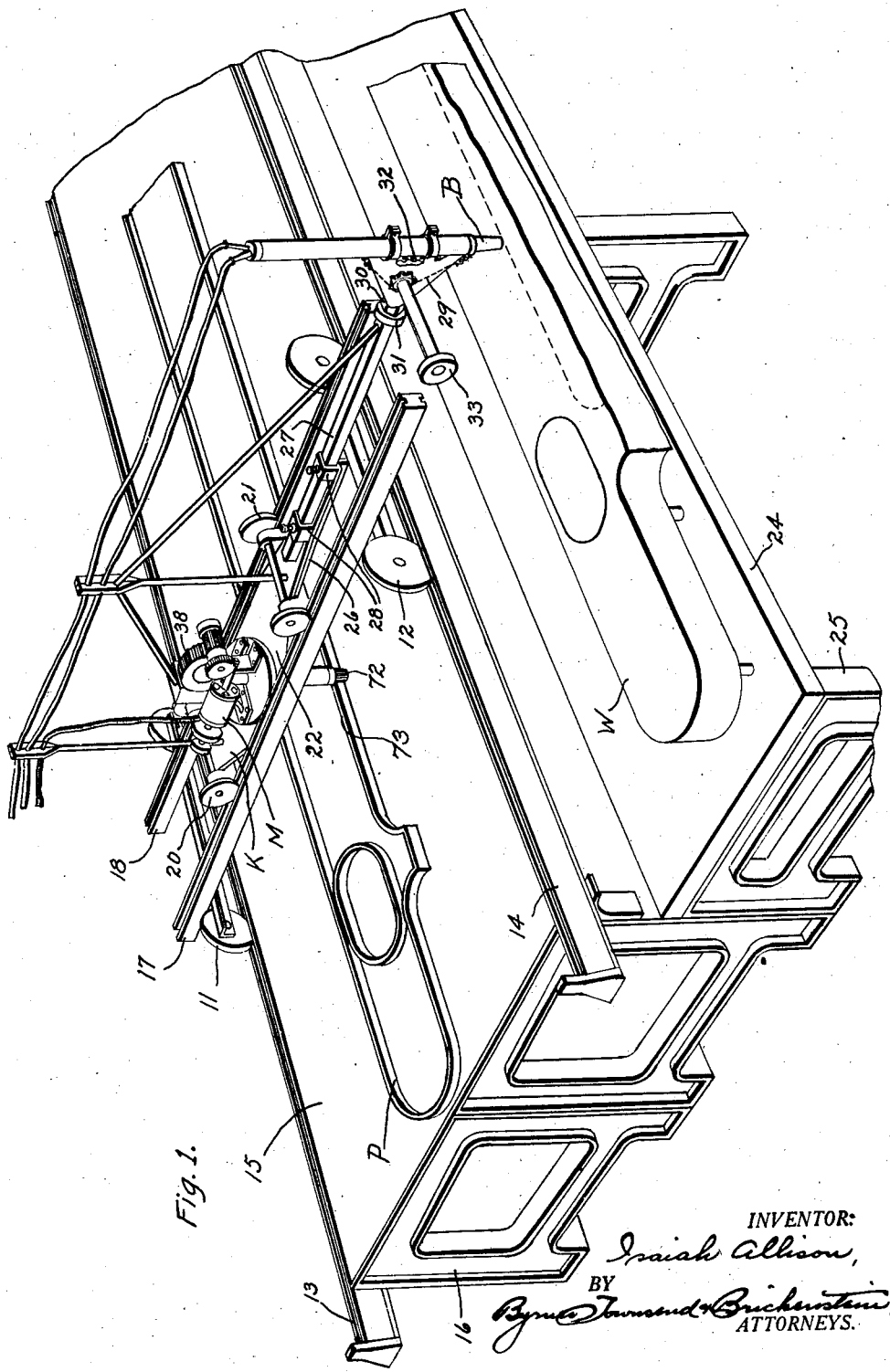

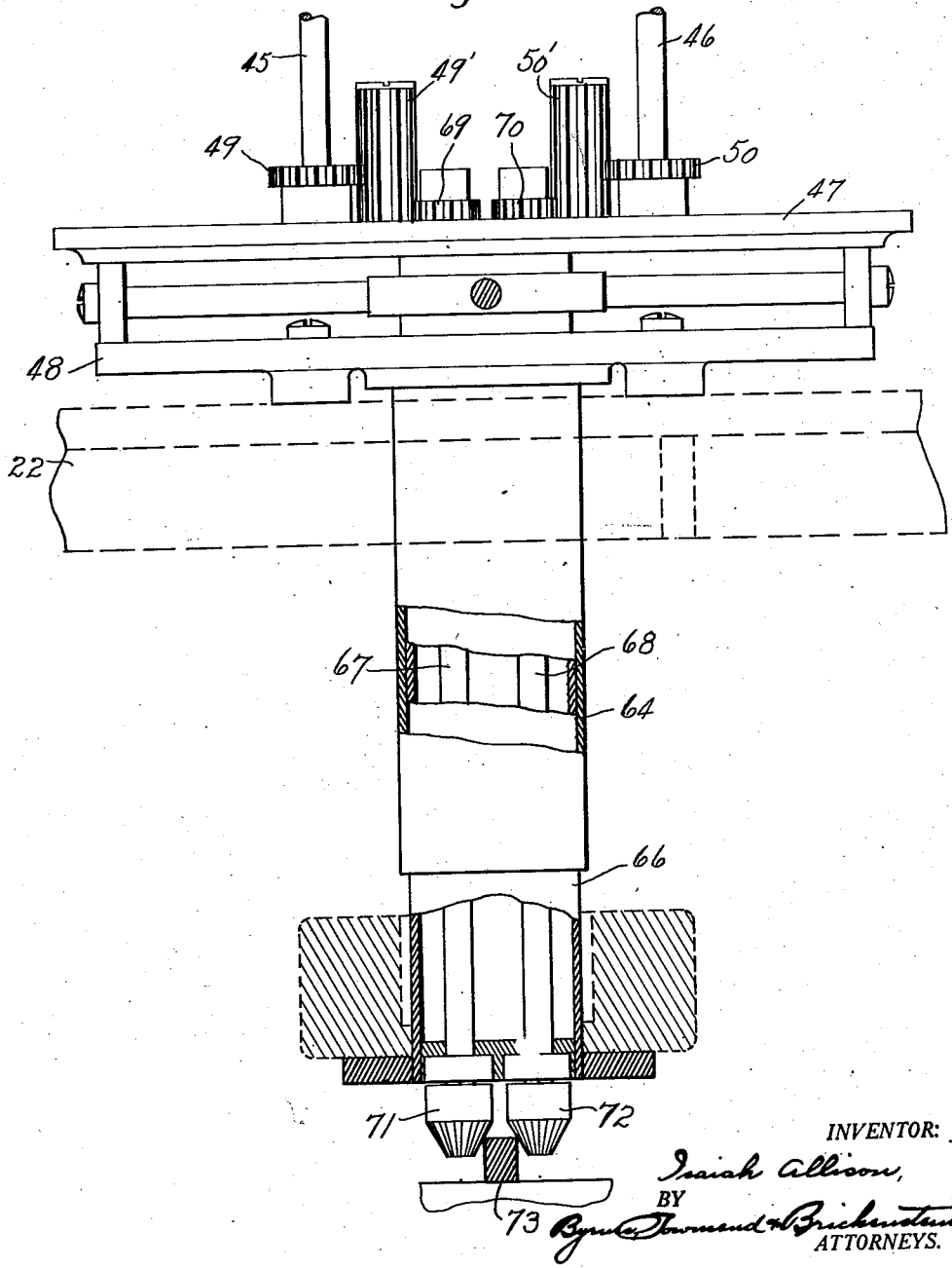

Patented Sept. 2, 1930

1,774,865

UNITED STATES PATENT OFFICE

ISAIAH ALLISON, OF FOREST PARK, ILLINOIS, ASSIGNOR TO THE OXWELD RAILROAD SERVICE COMPANY, A CORPORATION OF DELAWARE

BLOWPIPE APPARATUS

Application filed September 23, 1925. Serial No. 58,131.

This invention relates to metal cutting machines and particularly to machines which utilize oxy-acetylene and similar blowpipes for cutting metal shapes corresponding to preformed designs or patterns. However, it is to be understood that some features of this machine are of more general application and may be employed in other metal working machines, as for example, in welding machines employing oxy-acetylene and similar blowpipes.

The improvements of the present invention relate primarily to that class of machines in which a main and an auxiliary carriage are so mounted that a pattern tracing device driven by a motor on one of the carriages may propel the carriages and a blowpipe thereon in accordance with the contour of the pattern traced. Prior to my invention it has been the practice in such machines to secure both the pattern and the work piece or blank to be cut onto the same machine bed and between the main rails of the machine. This has numerous disadvantages which renders such machines impractical for use on work of large dimensions. Where the work or blank is quite long, as in the case of locomotive side rods of considerable length, the pattern must be the same length as the finished piece and the blank from which such piece is cut is usually longer. In such cases, it is necessary to provide an extremely long bed for the machine to support both the pattern and the work end to end in proper position for the tracer and the blowpipe to operate thereon. With a machine of such great length, it is difficult for one operator to handle the cutting, as it becomes necessary for him to go from side to side around the ends of the machine to watch the cutting at different points. Furthermore, with the work disposed on the machine bed between the main rails, the drive mechanism of the machine and other closely adjusted parts are often moved over parts of the work that have become very hot from the cutting operation, the excessive heat distorting and damaging the driving mechanism and other parts of the machine.

In order to avoid the foregoing objections, according to this invention, the work piece or blank is placed on a work support that is disposed alongside but outside the machine bed, i. e., outside but parallel to the space between the rails of the machine so that the work blank lies parallel to the pattern instead of end-to-end thereto. This greatly reduces the machine length required to handle long work and is much more convenient for the attendant. In addition, the blowpipe is mounted on the auxiliary or transversely-moving carriage so that it may be movable universally in a plane above the work support outside the space between the main rails. The heat from the blowpipe and from the heated work is therefore always at a considerable distance from the drive mechanism and other parts of the machine which might be damaged by heat, and the blowpipe is where it may be closely watched by the attendant of the machine. Such an arrangement practically divides in half the length of the machine making it much easier than formerly for a single operator to closely watch the work and at the same time see that the tracer accurately follows the pattern on the machine bed.

In order that the machine shall work accurately it is necessary that the loadings of the carriages shall be substantially symmetrical. The two carriages movable at right angles to one another are required to operate the blowpipe over the work substantially at uniform speed so that no matter whether the torch is moving in a straight line, along a curve line, or around a sharp corner the rate of cutting shall be constant. That is to say, if at any point the blowpipe runs slower than it should there is danger of burning the metal along the cut, and if the blowpipe runs faster than it should there is danger of improper cutting at such places. Accordingly, the improved mechanism is designed so that the driving means and the torch are mounted substantially symmetrically upon the auxiliary carriage, and the carriage frames, auxiliary carriage, and numerous other movable parts are made of aluminum to substantially reduce the mass and inertia of the movable part, so that the blowpipe may be moved over the work at a substantially uniform speed.

Under certain conditions it is found desirable to provide a template for cutting work that is to be duplicated. On the other hand, it is frequently necessary to cut out special pieces from a design drawn on a sheet or directly on the machine bed. Therefore, in accordance with one feature of this invention, the drive mechanism is equipped so that the machine may be either driven by mechanism that is automatically guided by a template; or manually guided by a hand-controlled tracing device by means of which a design may be followed, the hand-controlled and template-controlled drives being constructed to be interchangeably coupled to the electric driving motor.

Figure 2:
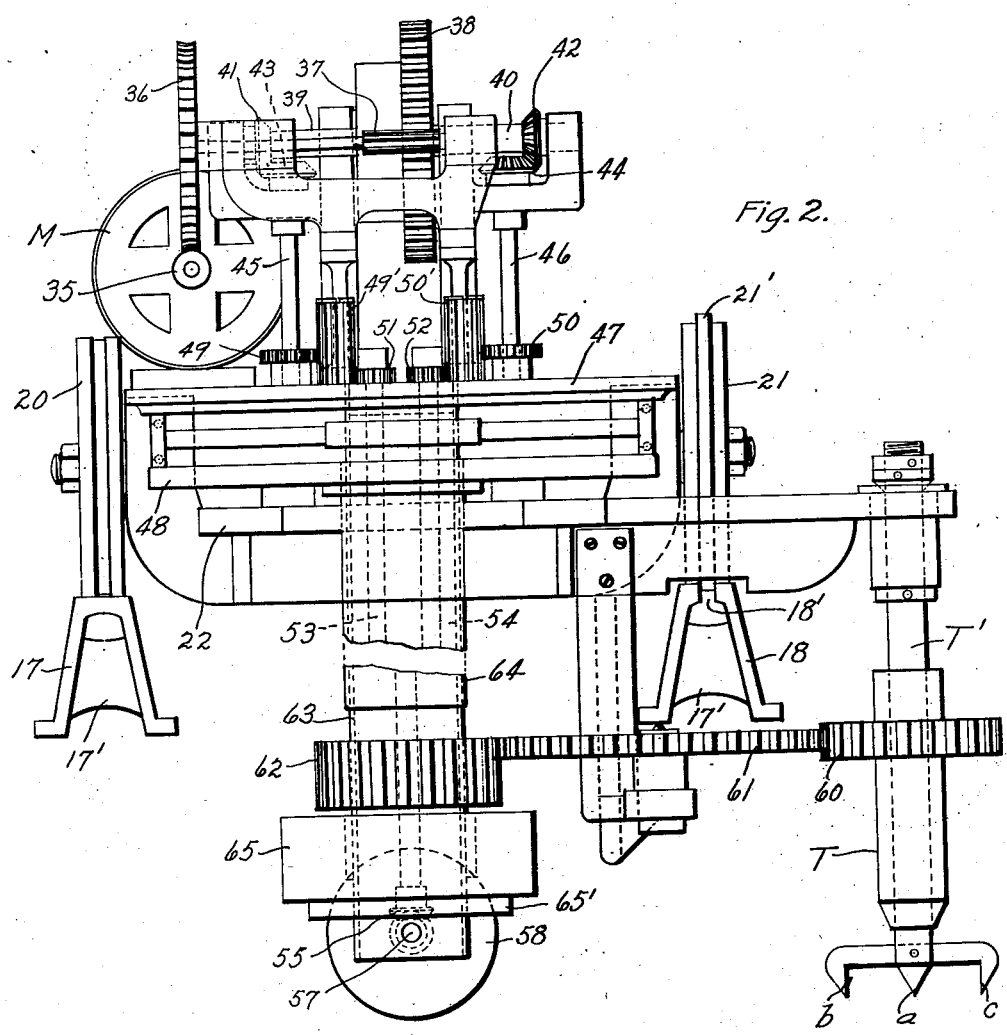

The objects and novel features of this invention will be more clearly understood by referring to the following specification and the accompanying drawings, in which Fig. 1 is a perspective view of a shape cutting machine embodying this invention; and Figs. 2 and 3 are enlarged views illustrating the interchangeable hand-controlled and automatically operating tracing and propelling mechanisms, adapted for attachment to the machine shown in Fig. 1.

Referring to Fig. 1 of the drawing, the improved shape cutting machine comprises a main or lower carriage C that has two pairs of wheels 11, 12, fitting suitable grooves in a pair of main rails 13, 14 extending along opposite longitudinal edges of the machine bed 15 that is mounted upon suitable frame members 16. The main carriage is thus freely movable longitudinally in either direction above the machine bed 15 upon which a design may be laid out or upon which a pattern, such as the pattern P, may be clamped or otherwise fastened.

The main carriage frame carries a pair of auxiliary rails 17, 18 which are spaced apart and disposed perpendicular to the main rails. The auxiliary rails serve as a track for the auxiliary or upper carriage K, which comprises two pairs of wheels 20, 21 and a frame 22 supported thereby. The carriage K is movable in either direction along the auxiliary rails and carries the propelling mechanism, the pattern tracing mechanism and the welding or cutting blowpipe means. The cooperation of the propelling mechanism and tracing mechanism causes the movement of either or both carriages in accordance with the pattern traced, thereby guiding the blowpipe correspondingly to cut out a piece similar and, in the present instance, equal in size to the pattern.

In order that the length of the machine shall not exceed practical limits, where quite long pieces are to be cut or welded, the work and support 24 is disposed alongside but outside the space between the main rails 13, 14, which arrangement has important advantages over those machines in which both the work and the pattern are supported end to end on the machine bed between the main rails. For convenience, as shown the work support 24 is mounted on frame members 25 in a horizontal plane somewhat lower than the machine bed 15, and the auxiliary rails slightly overhang the work support. The blank or work piece W is placed opposite or approximately parallel to the pattern on the machine bed so that as the tracer moves along the pattern outline the oxy-acetylene cutting blowpipe B will operate along a line parallel to the path of the tracer.

The means for supporting the blowpipe comprises an extension 26 on the frame of the carriage K that projects substantially midway between the rails 17, 18 and carries an arm 27 that is adjustable lengthwise of said extension and secured in its adjusted position by clamps 28. A bracket 29, that is adapted to support the blowpipe in any desired position vertically and angularly with relation to the work and work support, has a stem 30 that is rotatably adjustable in a clamp 31 at the outer end of the arm 27. The bracket 29 carries a chain 32 that is secured to the blowpipe and may be fed in either direction by a crank and sprocket means 33 or other suitable means to vary the height of the blowpipe. The combined length of the extension 26 and arm 27 is such that the latter projects outside the space between the main rails and sufficiently overhangs the work support to support the blowpipe over the latter for movement the required distance in any, and changing directions, as defined by the tracer that follows the pattern. The carriage K, the arm 27 and other parts on said carriage are desirably of aluminum to reduce its inertia and thereby afford more uniform movement of the blowpipe.

The propelling and tracing mechanism is mounted on the carriage K and comprises an automatically governed electric motor M which has its armature shaft connected through reduction gears 35, 36 to a shaft 37 geared to the ring gear 38 of a differential gear mechanism which has shafts 39, 40 carrying bevel gears 41, 42 meshing with bevel gears 43, 44 on upright shafts 45, 46. The shafts 45, 46 and parts driving them are mounted on a turntable 47 turnable in bearings on a fixed platform 48 on the frame 22 and carry spur gears 49, 50 coupled through intermediate gears with spur gears 51, 52 on the upper ends of shafts 53, 54 which have beveled gears 55, 56 at their lower ends geared to the shaft 57 of a knurled propelling wheel 58 that is adapted to roll along the surface of the machine bed 15 to move the carriages and blowpipe in accordance with the design being traced.

The direction of movement of the wheel 58 is determined by a manually operable tracer T having a vertical stem T' that is rotatably journalled in the frame 22. The tracer has a center point $a$ and two points $b$ and $c$ equally spaced at opposite sides of the point $a$, the three points being alined and adapted to follow a pattern or straight and curved lines of a design laid out or drawn upon the machine bed. The movements of the tracer T may be transmitted to the wheel 58 through suitable mechanism, as by a gear 60 fixed on the stem T', the gear 60 meshing with an intermediate gear 61 that meshes with an elongated gear 62 fixed on the inner tubular housing 63 that carries the wheel 58, the shafts 53 and 54, and the gears thereon. The housing 63 telescopically and removably fits into an outer tubular housing 64 that is fastened to the platform 48. A weight 65 fitting the housing 63 and resting on the ledge 65' of the latter serves to hold the wheel 58 down on its supporting surface and thereby provides more positive traction for said wheel. The removable telescopic housing 63 provides a construction whereby the wheel 58 and its drive means may be disconnected from the gears 49, 50, when it becomes desirable to substitute an automatically operable tracing means for the manually operable means just described. In such cases the gears 61, 60 and the tracer T may be left in position or removed as desired.

As illustrated in Fig. 3, the automatically operable tracer may consist of a unit that is interchangeable with the manually operable tracer. The inner tubular housing 66 thereof corresponds to the housing 63 and is slidable in the same manner into the housing 64. The housing 66 carries vertical shafts 67, 68 which have gears 69, 70 mounted on their upper ends and beveled toothed wheels 71, 72 mounted on their lower ends, the wheels 71, 72 being adapted to bite into the opposite faces or upper corners of a pattern bar 73 of aluminum, heavy cardboard or other suitable material, so that as the electric motor drives the power transmitting mechanism connected to the wheels 71, 72, the latter will exert traction on the pattern and automatically follow the pattern to cause the carriages to move the blowpipe over the work piece at a uniform speed in a path similar to the pattern. The differential mechanism serves to compensate for the difference in speed of the wheels 71, 72 when they are running along a curved part of the pattern bar or rounding corners. In both types of propelling devices, the telescoping housings may be of aluminum or other light material, and depend centrally from the auxiliary carriage centrally between the upper rails so that the weight and thrust of the mechanism is symmetrically disposed on the auxiliary carriage to afford more uniform cutting or welding speed. For example, the rails 17 and 18 of the upper carriage may be of cast aluminum having parallel side portions and reinforcing ties 17. The rail 17 may have a substantially flat top surface and the rail 18 may have a central sawcut 18' to provide a guide groove for the rib 21' of the wheel 21.

Various changes may be made in the details of construction without departing from the principles of this invention or sacrificing any of its advantages.

I claim:

1. In blowpipe apparatus for operating on metal, the combination of a pair of main rails, a main carriage movable along said rails, auxiliary rails supported by said main carriage, an auxiliary carriage movable along said auxiliary rails, a blowpipe-supporting arm carried by said auxiliary carriage substantially parallel to said auxiliary rails and substantially perpendicular to said main rails, a blowpipe carried by said arm outside the space between said main rails, and means adapted to propel said carriages to move said blowpipe in any and changing directions.

2. In blowpipe apparatus of the class described, the combination of a pair of substantially parallel main rails, a main carriage movable along said rails, a pair of auxiliary rails supported by said main carriage and extending transversely of said main rails, an auxiliary carriage movable along said auxiliary rails, a blowpipe carried by said auxiliary carriage and disposed outside the space between said main rails, and means for propelling said auxiliary carriage to thereby move said blowpipe in any and changing directions.

3. In blowpipe apparatus of the class described, the combination of a pair of substantially parallel main rails, a main carriage movable along said rails, a pair of auxiliary rails supported by said main carriage and extending transversely of said main rails, an auxiliary carriage movable along said auxiliary rails, a blowpipe-supporting arm carried by said auxiliary carriage and extending lengthwise of and between said auxiliary rails, a blowpipe carried by said arm, and means for propelling said auxiliary carriage to move said blowpipe at a substantially uniform speed in any and changing directions.

4. In a metal cutting blowpipe apparatus, the combination of a pair of substantially parallel main rails, a main carriage spanning said rails and movable along the same, a pair of auxiliary rails carried by said main carriage and perpendicular to said main rails, an auxiliary carriage spanning said auxiliary rails and movable along the same, a work support disposed alongside but outside the space between said main rails, a blowpipe-supporting arm carried by said auxiliary carriage and extending substantially lengthwise of said auxiliary rails between the latter, a blowpipe carried by said arm outside said space and above said work support, and means for driving said auxiliary and main carriages to thereby move said blowpipe in any direction over said work support.

5. In a machine of the class described, the combination of a pair of main rails; a main carriage movable along said rails; auxiliary rails supported by said main carriage; an auxiliary carriage movable along said auxiliary rails; a blowpipe carried by said auxiliary carriage; and mechanism for propelling said carriages to move said blowpipe in any and changing directions, such mechanism comprising driving means depending from said auxiliary carriage and extending downwardly between the auxiliary rails.

6. A machine according to claim 5, in which said blowpipe is carried by an arm that is disposed in the space between said auxiliary rails, whereby the propelling mechanism and the blowpipe with its carrying means are symmetrically disposed on said auxiliary carriage to balance the same.

7. A machine according to claim 5, in combination with a blowpipe-supporting arm carried by said auxiliary carriage and disposed perpendicular to the main rails, said blowpipe being mounted on said arm outside the space between said main rails and overhanging one side of the machine.

8. A machine according to claim 5, in combination with hand tracing means operatively connected to said depending driving means.

9. In blowpipe apparatus, the combination of a blowpipe, means for supporting the same for universal movement in a plane, means for driving said supporting means, said driving means comprising a vertical shaft and a wheel driven thereby and adapted to engage a horizontal surface that provides a traction surface for driving the machine, and a hand tracing device so geared to the driving mechanism as to steer the wheel in accordance with a pattern.

10. In blowpipe apparatus, the combination of a blowpipe, means for supporting the same for universal movement in a plane, means for driving said supporting means, and means operatively connected to said driving means for guiding the same in accordance with a pattern, said guiding means comprising an arm disposed above the bed of the machine and provided with three alined points to trace a line.

11. Blowpipe apparatus comprising a blowpipe, means for supporting the same for universal movement in a plane, and mechanism for driving said supporting means comprising a hand-guided drive device and a template tracing device interchangeably mountable on such supporting means.

12. Blowpipe apparatus according to claim 11, in which said mechanism comprises a vertical tubular housing, and said interchangeable devices removably fit said housing and comprise a template engaging drive wheel and a hand-guided drive wheel.

13. In blowpipe apparatus, the combination of a machine bed upon which a pattern may be supported or a design laid out, a work support disposed alongside and below the plane of said machine bed, a blowpipe, means for supporting said blowpipe for universal movement in a plane above said work support, and mechanism for moving such supporting means comprising a tracing means adapted to follow said pattern or design.

14. In blowpipe apparatus, the combination of a pair of main rails, a horizontal machine bed between said main rails upon which a pattern may be supported or design laid out, a main carriage movable along said main rails, auxiliary rails supported by said main carriage, an auxiliary carriage movable along said auxiliary rails, a work support disposed alongside said machine bed but outside the space between said main rails, a blowpipe carried by said auxiliary carriage and disposed above said work support, and mechanism for moving said auxiliary carriage with said blowpipe in any and changing directions in a horizontal plane.

15. In blowpipe apparatus for operating on metal, the combination of spaced supporting rails, auxiliary supporting means extending transversely of said rails and movable along the latter, means for supporting a pattern in the space between said rails, and a blowpipe outside said space and carried by said auxiliary supporting means, said auxiliary supporting means and blowpipe being movable so as to follow the outline of said pattern.

16. In blowpipe apparatus for cutting metal, the combination of parallel supporting rails spaced apart, auxiliary supporting means movable along said rails comprising guiding means extending transversely of said rails, means for supporting a pattern in the space between said rails, a carriage movable along said guiding means, and a cutting blowpipe outside the space between said rails and mounted on said carriage, said carriage and blowpipe being operable to follow the outline of said pattern and cut work disposed outside the space between said rails.

17. In blowpipe apparatus, the combination of spaced supporting rails; a machine bed between said rails; a carriage movable along said rails; a work support alongside said machine bed but outside the space between said rails; mechanism for following a pattern or design on said machine bed; a blowpipe adapted to produce a gaseous jet for operating upon work disposed on said work support; and supporting means on said carriage for said mechanism and said blowpipe.

In testimony whereof, I affix my signature.

ISAIAH ALLISON.